Aug. 29, 1967  A. E. MARTENS  3,338,680
TEMPERATURE COMPENSATING SYSTEM
Filed April 1, 1963  2 Sheets-Sheet 1

INVENTOR.
ALEXANDER E. MARTENS
BY Arthur L. Nelson
Frank C. Parker
ATTORNEYS

Aug. 29, 1967   A. E. MARTENS   3,338,680
TEMPERATURE COMPENSATING SYSTEM
Filed April 1, 1963   2 Sheets-Sheet 2

INVENTOR.
ALEXANDER E. MARTENS
BY Arthur L. Nelson
Frank C. Parker
ATTORNEYS

United States Patent Office 3,338,680
Patented Aug. 29, 1967

3,338,680
TEMPERATURE COMPENSATING SYSTEM
Alexander E. Martens, Greece, N.Y., assignor to Bausch & Lomb Incorporated, Rochester, N.Y., a corporation of New York
Filed Apr. 1, 1963, Ser. No. 269,620
13 Claims. (Cl. 23—253)

This invention relates to a temperature responsive timing mechanism and more particularly to an electrical frequency control device driving a frequency synchronous mechanism at a speed responsive to temperature changes.

The time rate of many chemical reactions strongly depends on the temperature of reagents. This is particularly true for the majority of reactions involving organic compounds.

A large number of modern analytical procedures are based on determination of certain physical changes taking place in the reagent solution (selective light absorption, change of electrical resistivity, etc.), within a known time interval at a known and fixed temperature. The temperature dependence of such measurements is quite high in many instances. It is expressed by the Arrhenius equation as follows:

$$K = Be^{-\frac{E}{RT}}$$

where $K$ = reaction rate
$E$ and $B$—constants, pertinent to the reaction
$R$—gas constant
$T$—absolute temperature
$e$—the natural, or Napierian base The change of reaction rate as a function of temperature $$\frac{dK}{dT_0} = \frac{E}{RT_0^2} B e^{-\frac{E}{T}} = \frac{E}{RT_0^2} K$$

Hence, for a small temperature change ($\pm 3°$ C. or less at room temperature) it may be written with sufficient degree of accuracy $$\Delta K = \frac{EK}{RT_0^2} \Delta T_0 = \frac{CK \Delta T_0}{T_0^2} \quad (1)$$

where $$C = \frac{E}{R}$$

$T_0$—is the nominal absolute temperature
$K$—the reaction rate, known for this temperature
$R, T$—constants
$\Delta K$—the reaction rate change for
$\Delta T_0$—the temperature variation Obviously there exists a linear dependence between the reaction rate change and the reagent temperature change over a small temperature range.

When light absorption is used for quantitative analysis by means of a specific reaction the concentration of the substance in question is related to change in absorbance by the following expression.

$$\Delta AM = Vt\left(1 + \frac{C \Delta T_0}{T_0^2}\right) N \quad (2)$$

where $\Delta A = A_2 - A_1$ the difference in light absorbance over the time interval $t$ $M$—The proportionality constant
$V$—the sample volume
$t$—the reaction time interval $$1 + \frac{C \Delta T_0}{T_0^2} = \frac{K + \Delta K}{K}$$

the temperature dependence factor
$N$—the substance concentration.
If $V$, $t$ and $M$ are known, and $$1 + \frac{C \Delta T_0}{T_0^2}$$

either also known or compensated for, the concentration $N$ may be established from the difference in light absorbance $\Delta A$, using $$N = \frac{\Delta AM}{Vt\left(1 + \frac{C \Delta T_0}{T_0^2}\right)} \quad (3)$$

This formula is valid for small variations of temperature. To obtain accurate results the temperature of the sample during the reaction time interval $t$ must be kept within a close tolerance. In many reactions $\pm 0.1°$ C. is the maximum allowable deviation.

While generally, it is not difficult to obtain a temperature stability to within $\pm 1°$ C., the problems of maintaining closer tolerances, especially in large non-homogeneous volumes, such as reaction chambers in analytical instruments, become increasingly complex with more stringent temperature stability requirements.

A system which would allow an accurate analysis of a large number of similar samples on automatic or semi-automatic basis independent of the ambient temperature is highly desirable.

The subject of this invention is a method of compensation of the reaction conditions for limited temperature changes, in an environment with coarsely controlled temperature $\pm 3°$ C., by variation of the reaction time interval $t$ in accordance with the precise temperature of the sample.

Considering expression 2 it may be seen that if the reaction time $t$ is varied as $$t = \frac{t_0}{1 + \frac{C \Delta T_0}{T_0^2}} \approx t_0\left(1 - \frac{C \Delta T_0}{T_0^2}\right)$$

where $t_0$ is the nominal reaction time interval at known temperature $T_0$, the effects of temperature variations are cancelled in Formula 3

$$N = \frac{\Delta AM}{Vt_0} = \text{Constant} \cdot \Delta A$$

The resistance of a thermistor is temperature dependent and expressed as $$R_{T_0} = \gamma e^{\frac{\beta}{T_0}}$$

Over a small temperature range the resistance change may be approximated with a high degree of accuracy by $$\Delta R_{T_0} = -\frac{\Delta T_0 R_{T_0} \beta}{T_0^2} \quad (4)$$

Hence, the ratio of resistance over the temperature $T$ to $T + \Delta T$ is $$\frac{R_{T_0} + \Delta R_{T_0}}{R_{T_0}} = 1 - \frac{\Delta T_0}{T_0^2}$$

The thermistor can be utilized directly as a part of the frequency determining network in an RC oscillator in which case the frequency of the signal can be described by $$f = \frac{b}{\sqrt{R_{T_0}}}$$

where $b$ is the proportionality constant, and thus the length of a cycle $$t' = \frac{1}{f} = \frac{\sqrt{R_{T_0}}}{b}$$

The oscillator drives a synchronous timing motor through a suitable power amplifier. The timing period changes in proportion to the length of the cycle of the oscillator and hence in proportion to the temperature change.

To be fully effective, this method requires the use of two matched thermistors to produce $$t' = \frac{1}{f} = \frac{R_{T_0}}{b}$$

Furthermore, the relation $$\frac{\Delta K}{K} = \frac{\Delta R_{T_0}}{R_{T_0}}$$

has to be satisfied to produce desired reaction rate compensation.

The following improved system eliminates these disadvantages while providing the necessary temperature compensation:

The thermistor is made to be a part of a voltage divider or Wheatstone bridge; the incremental voltage change is introduced, through a suitable variable gain amplifier, into a voltage controlled oscillator (voltage-to-frequency converter). The oscillator changes its frequency linearly in proportion with the control voltage, which in turn depends upon the temperature change. The gain of the amplifier can be adjusted to match $$\frac{\Delta R_{T_0}}{R_{T_0}}$$

slope to $$\frac{\Delta K_0}{K_0}$$

for any suitable thermistor or chemical reaction, as long as these factors are known or can be experimentally determined. The timing period $t$ is related to the temperature of the sample by $$t = t_0\left(1 - \frac{\Delta T_0 \beta}{T_0^2} G\right)$$

where $G$ is the amplifier and oscillator transfer function. Substituting into (3)

$$N = \frac{M \Delta A}{V t_0\left(1 - \frac{\Delta T_0 \beta}{T_0^2} G\right)\left(1 + \frac{\Delta T_0 C}{T_0^2}\right)}$$

$$= \frac{M \Delta A}{V t_0\left[1 - \frac{\Delta T_0 \beta}{T_0^2} G + \frac{\Delta T_0 C}{T_0^2} - \frac{(\Delta T_0)^2 \beta C G}{T_0^4}\right]}$$

The last term in brackets may be neglected. To obtain complete compensation we must have $$\frac{\Delta T_0 \beta G}{T_0^2} = \frac{\Delta T_0 C}{T_0^2}$$

or $$BG = C \quad (5)$$

Now from (1)

$$C = \frac{\Delta K T_0^2}{K \Delta T_0}$$

and from (4)

$$\beta = \frac{-\Delta R_{T_0} T_0^2}{R_{T_0} \Delta T_0}$$

substituting into (5)

$$-\frac{\Delta R_{T_0} T_0^2}{R_{T_0} \Delta T_0} \quad G = \frac{\Delta K T_0^2}{K \Delta T_0}$$

$$G = -\frac{\Delta K R_{T_0}}{K \Delta R_{T_0}} \quad (6)$$

If the relation (6) is satisfied, i.e., the gain is appropriately adjusted, the readout of the concentration is temperature independent over a range of approximately ±3° C. about an arbitrary reaction temperature.

Accordingly, this invention varies the time interval responsive to temperature variations associated with a temperature sensitive operation.

It is an object of this invention to provide a temperature responsive timing mechanism to control the time interval of a temperature sensitive operation.

It is another object of this invention to provide an oscillator with a temperature responsive element controlling the frequency of oscillation and timing the reaction in a chamber.

It is a further object of this invention to provide a temperature responsive voltage indicating element in a reaction chamber to thereby control the frequency of oscillation driving a synchronous mechanism which in turn controls the reaction time.

It is a further object of this invention to provide a thermistor in a reaction compartment which controls the frequency of oscillation of an oscillator for driving a timing mechanism in the reaction chamber.

The objects of this invention are accomplished by providing a reaction chamber having temperature regulating means which regulates the temperature in a chamber within some narrow limits. The inability of maintaining a constant temperature is compensated for by the use of a thermistor positioned within the reaction chamber. The thermistor controls a voltage in an oscillator circuit or an amplifier means controlling an oscillator circuit to vary the frequency in response to minor variations of temperature in the reaction chamber. The oscillator output is amplified if necessary to provide the necessary power for driving of a synchronous motor. The speed of the motor in revolutions per minute is controlled in response to the timing of the cycles of each of the oscillator frequencies to thereby vary the reaction time in the reaction chamber.

Any suitable device to control the time-temperature relationship of the reacting components in the chamber may be used. This may be in the order of a mechanism carrying a reacting sample through the reaction chamber, or initiating reaction of the sample and recording and terminating recording and possibly reaction at the end of the desired interval of time. The preferred embodiments of this invention are disclosed in the attached drawings which are considered to be illustrative and not limiting.

Figures 1, 2:
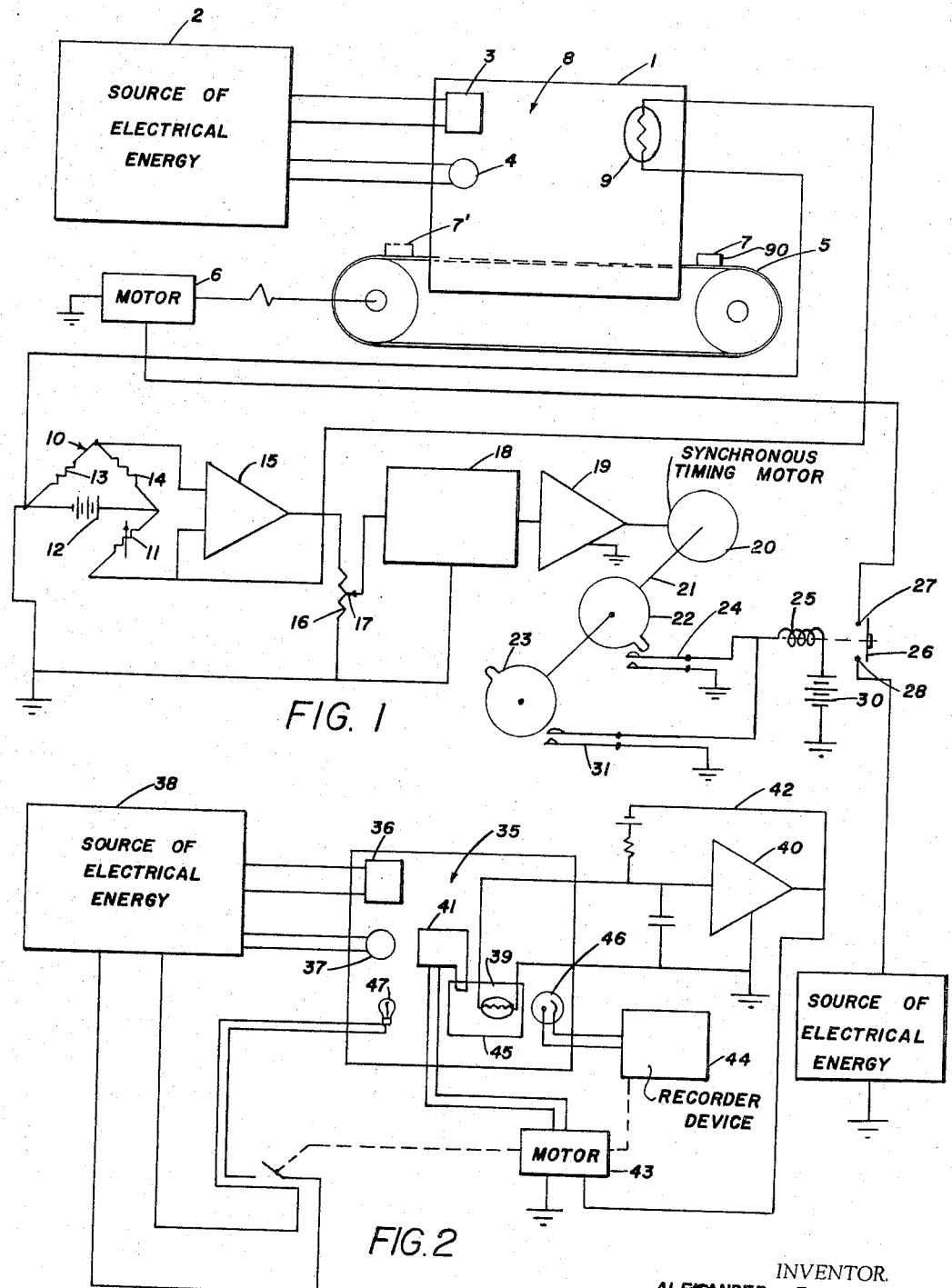
FIG. 1 is a schematic diagram illustrating a temperature responsive element controlling the frequency of oscillation for driving a synchronous motor and thereby controlling movement of a sample into the reaction chamber and withdrawing the sample on the opposite side.
FIG. 2 is a schematic diagram illustrating a modification where the reaction is initiated and the recording mechanism is also initiated in response to the temperature controlled mechanism.

The schematic diagram illustrated in FIG. 1 sets forth a general layout of the temperature responsive oscillator operating a synchronous motor for driving the sample through the reaction chamber and controlling the reaction time.

The reaction chamber 8 is formed by the enclosure 1, as schematically illustrated, and is suitably insulated and temperature controlled. For the purpose of illustration a source of electrical energy 2 is electrically connected to the heater 3 and thermostatically controlled by the thermostat 4. A suitable arrangement is provided for the sample to be conveyed into and out of the reaction chamber 8 such as a conveyor 5 driven by the motor 6. The motor 6 is connected to the output of the electric driving means responsive to the oscillator 18 and amplifier 19. The sample 7 is prepared at a predetermined temperature as the reacting components are combined within a container 90 and then placed on the suitable conveyor means 5 as illustrated. The speed of the conveyor determines the time interval which the sample 7 is within the chamber 8. The sample 7 passes through the chamber and leaves the chamber on the opposite side as indicated by the phantom view 7'. Although a conveyor is used schematically in this illustration the inventor does not wish to limit the invention to the specific means as illustrated for controlling the timing of the sample within the chamber. Any suitable arrangement providing the operation as schematically illustrated is considered to be within the scope of this invention.

An electrical means is used to drive the motor 6. As illustrated in FIG. 1 a thermistor 9 is positioned within the chamber 8 and is electrically connected to a bridge circuit 10. The thermistor 9 forms one of the legs in the bridge 10. The bridge 10 includes a variable resistor 11 connected in series with the thermistor 9 across a battery 12. The battery is connected to ground on the one side and on the opposite side to the opposite end of the variable resistor 11 from the connection to the thermistor 9. The other two legs of the bridge 10 are formed by two resistors 13 and 14 in series which are also connected across the battery 12 and in parallel to the two legs comprising the thermistor 9 and variable resistor 11. The junctions intermediate the resistors 13 and 14 are connected to the input of a direct current amplifier 15. The junction intermediate the variable resistors 11 and the thermistor 9 are also connected to the input of the amplifier 15. The output of the amplifier 15 is direct current which is connected to the end of the voltage divider 16 which is grounded on its opposite end. A sliding contact 17 is preset to give the desired input to the oscillator 18. The oscillator 18 is more specifically described in subsequent diagrams. The oscillator 18 as illustrated feeds into a second amplifier 19 which provides an output for operation of a synchronous motor 20. The synchronous motor drives a shaft 21 supporting the cams 22 and 23. As illustrated the cam 22 initiates operation of the motor 6 by closing the switch 24 and energizing the solenoid 25 which closes the arm 26 on the contacts 27 and 28. The motor 6 operates for sufficient time while switch 24 is closed to carry the sample into the reaction chamber. The sample is aligned with a light beam (not shown) for recording the reaction of the sample.

The synchronous motor 20 continues to operate at the rate controlled by the frequency developed in the oscillator 18. The rotation of the shaft 21 continues until the cam 23 closes the switch 31 at the end of the controlled time interval, which energizes the solenoid 25 causing the motor 6 to carry the sample out of the chamber. Other circuits for controlling switches, cams and motors might be devised wherein various operations might be obtained. It is understood that the illustration as shown is merely illustrative and not limiting.

Referring to FIG. 2 a modified schematic diagram is illustrated. The reaction chamber 35 contains a heating element 36 and thermostat 37 electrically connected to the source of electrical energy 38. The thermostat maintains a temperature within narrow limits within the reaction chamber 35. Minor variations in the temperature are compensated by the thermistor 39 which is temperature responsive to control the frequency of the oscillator circuit 40. This schematic diagram is similar to FIG. 1 although the reacting components in the sample are retained within the reaction chamber 35. The initiating and recording of the reaction are controlled through the timing device. As the reaction is initiated by the device 41, the oscillator 40 is operating at a frequency of responsiveness to the temperature within the reaction compartment 35 through the thermistor 39. The thermistor 39 is suitably connected to the oscillator 40 to control the frequency of operation responsive to temperature in the chamber. The output of the oscillator 40 drives the motor 43, which in turn is connected to the recorder 44 and lamp 47. The lamp 47 directs a beam of light through the sample 45. The change in light transmission through the sample indicates the chemical composition of the sample by means of the photosensitive element 46 which is recorded on the recording device 44.

When an interval of time has elapsed, which is dependent upon the temperature in the reaction chamber 35, the recording of reaction of the sample is terminated. In other words a shorter interval of time is needed for the reaction if the temperature in the reaction chamber 35 is higher. A higher temperature in the reaction chamber increases the frequency of the oscillator 40 which directly controls the r.p.m. of the synchronous motor 43. The overall effect of the device as illustrated in schematic diagram of FIG. 2 is substantially the same as that illustrated in FIG. 1. A suitable arrangement for recording is also provided in FIG. 1 although the schematic illustration does not illustrate the components in detail.

Figure 3:
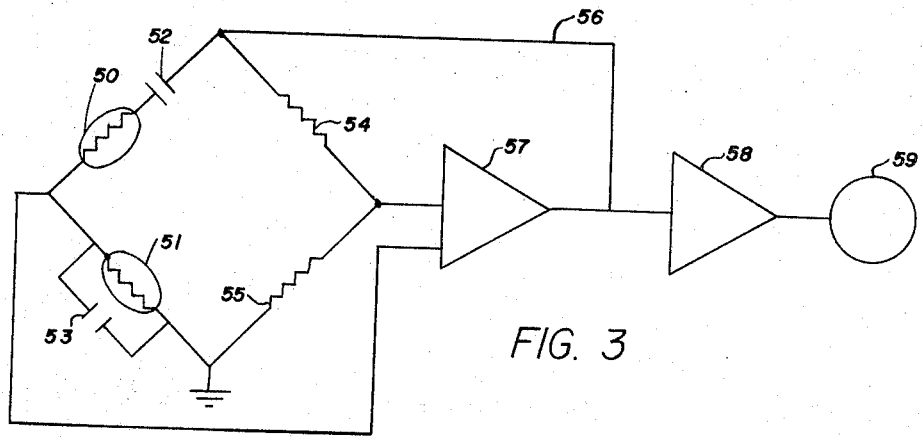
FIG. 3 illustrates a Wien-bridge oscillator having thermistors in the bridge circuit for controlling the frequency.

FIG. 3 illustrates an oscillator which might be adapted for use in either of FIGS. 1 or 2 by modifying the circuit accordingly. The oscillator is of a Wien-bridge type wherein two of the resistors in the bridge circuit are replaced by thermistors 50 and 51. The thermistors are located in the temperature sensitive chamber. The capacitor 52 is in series with the thermistors 50 and the capacitor 53 is in parallel with the thermistor 51. The other two legs of the bridge circuit comprise the resistors 54 and 55. The junction of the thermistor 51 and the resistor 55 is connected to ground. The feedback loop 56 is connected to the output of the oscillator 57 and to the junction of the capacitor 52 and the resistor 54. The junctions of resistors 54 and 55 feed into the control element of the oscillator 57. The cathode of the oscillator 57 is connected to the junction of thermistors 50 and 51. The output of the oscillator 57 preferably would feed into an amplifier 58 of which the output would drive a synchronous motor 59.

Figure 4:
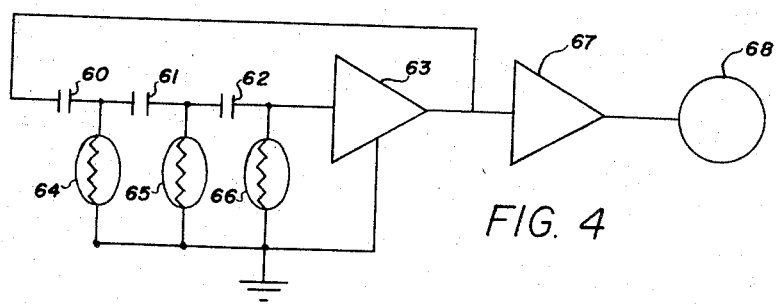
FIG. 4 illustrates a phase shifting oscillator circuit employing temperature responsive elements in the input circuit.

FIG. 4 illustrates a phase-shift oscillator with three capacitors 60, 61 and 62 in series, with capacitor 62 connected to the control element of the oscillator 63. Intermediate capacitors 60 and 61 is a thermistor 64 and thermistor 65 is connected intermediate capacitors 61 and 62 with thermistor 66 connected to the control grid. The opposite ends of the thermistors 64, 65 and 66 are connected to ground. The output of the oscillator 63 is connected through the amplifier 67 to the synchronous motor 68.

Figure 5:
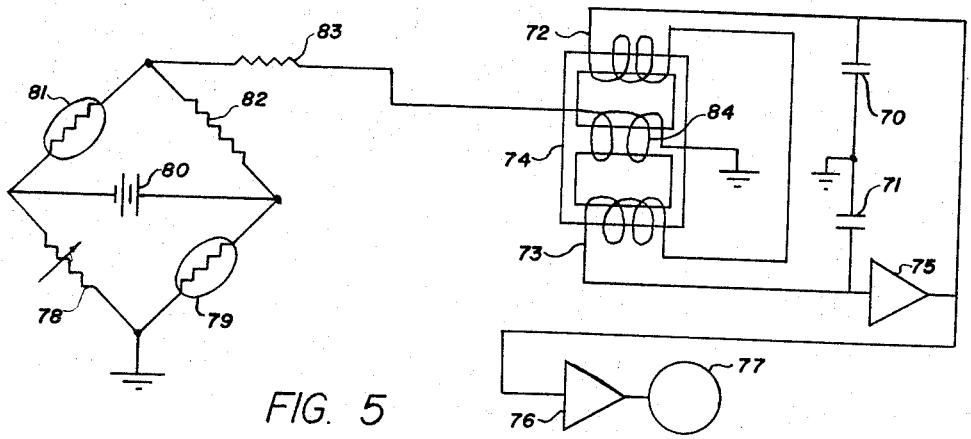
FIG. 5 illustrates a Colpitts type oscillator having a saturable reactor core for varying the frequency of the oscillator.

FIG. 5 illustrates a Colpitts oscillator having the saturable reactor core forming the inductance of the tuned circuit. The split capacitance is formed by the capacitors 70 and 71 with the intermediate point of these two capacitors being connected to ground. Connected with these two capacitors are the inductances 72 and 73 which are wound around a saturable core 74. The control element of the oscillator 75 is connected to the junction of the coil 73 and capacitor 71 and the junction of capacitor 70 and coil 72 are connected to the plate circuit of the oscillator 75. A power amplifier 76 is also positioned between the oscillator 75 and the synchronous motor 77. The frequency of the oscillator 75 is controlled through a bridge circuit of which the resistor 78 and the thermistor 79 are connected at a junction point to ground. These two elements are connected across the battery 80. The second two legs of the bridge are formed by the thermistor 81 and resistor 82 which are serially connected across the battery 80. The junction of the thermistor 81 and resistor 82 are connected to the resistor 83 to the coil 84 to ground.

The thermistors as illustrated in the above oscillator circuits will be positioned in the reaction chamber as illustrated in the schematic diagram of FIGS. 1 and 2. The thermistors provide the voltage, or time constant changes which influences the frequency generated by the oscillator. The thermally responsive element varies the input signal which in turn varies the frequency. A change in frequency likewise changes the speed of rotation in revolutions per minute of a timing device and thereby controls the timing interval of a suitable device associated with the reaction chamber.

Referring to FIG. 1, the reaction components of sample 7 are positioned within the container 90. At a predetermined temperature the components are positioned at an entrant point adjacent the reaction chamber 8. The motor 20 is operating continuously. As the cam 22 closes switch 24 the motor 6 is energized and the sample is carried into the chamber 8. Upon elapse of the controlled time interval, cam 23 engages the switch 31, which energizes the motor 6 to remove the sample 7 from the chamber 8. A suitable recording device is provided which optically or electrically determines the degree of reaction in the sample.

FIG. 2 is a similar device in its operation although the recording as illustrated is more specifically set forth. The reaction is initiated by the reaction initiating means 41, and controlled by the motor 43 which also controls the recording. The interval of reaction time is determined by the oscillator 40 which oscillates at a frequency responsive to the temperature in the reaction chamber 45. The oscillator 40 controls the synchronous motor which determines the time interval during which a light beam is directed from the source of illumination 47 through the sample and recorded by the photosensitive element 46 on the recording device 44.

The preferred embodiments of this invention have been illustrated and described. Other modifications might be devised which may fall within the scope of this invention which is defined by the scope of the attached claims.

I claim:

1. A device of the character described comprising, in combination, a chamber having temperature control within narrow limits, a frequency generating device for generating an oscillating signal including a temperature sensitive element in said chamber causing a variation in the frequency of oscillation responsive to temperature variations in said chamber, an amplifier connected to said frequency generator for amplifying the oscillating signal, frequency responsive timing means having an output related to the frequency of an electrical signal applied thereto connected to said amplifier to operate a control means for timing an operation in said chamber in accordance with the frequency of said oscillator.

2. A device of the character described comprising, in combination, a reaction chamber, an oscillator generating an oscillating signal, a temperature sensitive element connected to said oscillator positioned in said reaction chamber for controlling the frequency of oscillation of said oscillator, means for amplifying the oscillator signal associated with said oscillator, frequency responsive timing means having an output related to the frequency of an electrical signal applied thereto connected to said amplifier means for controlling a reaction time interval within said reaction chamber.

3. A device of the character described comprising, in combination, means defining a reaction chamber, an oscillator circuit including a temperature sensitive element connected in said oscillator circuit and positioned in said chamber to generate a signal responsive to the temperature in said chamber for controlling frequency of oscillation, an amplifier connected to the output of said oscillator for amplifying said oscillator signal, frequency responsive timing means having an output related to the frequency of an electrical signal applied thereto receiving an output signal from said amplifier and controlling a timing interval for controlling the reaction in said chamber and the recording of information associated with the reaction in said chamber.

4. A device of the character described comprising, in combination, means defining a reaction chamber, an oscillator for generating an oscillator signal including at least one temperature sensitive element in said reaction chamber connected to said oscillator circuit for controlling the frequency of oscillation responsive to temperature variations, amplifier means connected to said oscillator for amplifying the oscillator signal, a synchronous device driven by the oscillator signal from said amplifier and controlling the timing interval for the reaction in said reaction chamber and recording information derived from the reaction in said chamber during said timing interval.

5. A temperature responsive timing mechanism comprising an oscillator generating an oscillating electrical signal, a temperature sensitive element in the oscillator circuit controlling the frequency of said oscillator responsive to temperature variations of said temperature sensitive element, an amplifier connected to said oscillator for amplifying said oscillating signal, a synchronous device connected to said amplifier and operating at a frequency in accordance with the frequency of said oscillating signal and adapted for controlling a time interval of a temperature sensitive operation varying in length in response to the temperature of said temperature sensitive element.

6. A temperature response timing mechanism comprising a Wien-bridge oscillator, at least one temperature sensitive element in the bridge circuit of said Wien-bridge oscillator for controlling the frequency of oscillation responsive to the temperature of said temperature sensitive element, an amplifier connected to said oscillator for amplifying the oscillating signal, a synchronous motor connected to said amplifier for operating at the frequency of said oscillator, control means connected to said synchronous motor for controlling a time interval for a temperature sensitive operation in response to the temperature of said temperature sensitive element.

7. A temperature responsive timing mechanism comprising a Colpitts oscillator for generating an oscillating signal, a saturable core forming the inductance in said oscillator circuit, a variable current source serially connected with an inductance coil connected to said saturable core, a source of electrical energy and at least one thermistor in said variable current source circuit for varying the current flow through said coil responsive to the temperature changes on said thermistor, an amplifier associated with said oscillator for amplifying the oscillator signal, a synchronous motor connected to the amplifier for operating at a frequency synchronous with the frequency of said oscillator and adapted for controlling the time interval in accordance with temperature changes of said thermistors.

8. A temperature responsive timing mechanism comprising a phase-shift oscillator generating an oscillating signal, at least one temperature sensitive element in the phase-shifting portion of said oscillator circuit for varying the frequency of said oscillator in response to temperature changes of said temperature sensitive element, an amplifier for amplifying the oscillator signal, a synchronous motor connected to the amplifier output adapted for measuring a time interval and controlling a temperature sensitive operation associated with the temperature of said temperature sensitive element and thereby controlling the time interval responsive to temperatures on said temperature sensitive element.

9. A temperature responsive timing mechanism comprising means defining a reaction chamber, an oscillator for generating an electrical oscillating signal, at least one temperature sensitive element in said oscillator associated with said reaction chamber for varying the frequency of said oscillator in response to temperature changes on said temperature sensitive element, an amplifier connected to the output of said oscillator for amplifying said oscillator signal, a synchronous motor connected to said amplifier for operating at the frequency of said oscillator and thereby controlling a timing interval of a temperature sensitive operation associated with said reaction chamber, recording means for recording a condition in said reaction chamber controlled by the timing interval of said synchronous motor.

10. A device of the character described comprising, in combination, means defining a temperature controlled chamber, a frequency generating device for generating an oscillating signal including a temperature sensitive element in said chamber generating a variable time constant responsive to temperature variations in said chamber to vary the frequency of said oscillator, an amplifier connected to said frequency generator for amplifying the oscillating signal, frequency responsive timing means having an output related to the frequency of an electrical signal applied thereto connected to said amplifier to operate a control means for timing an operation in said chamber in accordance with the frequency of said oscillator.

11. A temperature responsive timing mechanism comprising means defining a reaction chamber, an oscillator for generating an electrical oscillating signal, at least one temperature sensitive element in said oscillator associated with said reaction chamber for varying the frequency of said oscillator in response to temperature changes on said temperature sensitive element, an amplifier connected to the output of said oscillator for amplifying said oscillator signal, a synchronous motor connected to said amplifier for operating at the frequency of said oscillator and thereby controlling the reaction time of a temperature sensitive operation associated with said reaction chamber.

12. A temperature responsive timing mechanism for controlling the time duration a temperature sensitive reaction is maintained within a controlled temperature chamber comprising:
  oscillator means for generating an electrical signal;
  temperature sensitive means having a temperature sensitive element exhibiting an electrical property, the value of which varies with temperature, mounted within the chamber and connected to said oscillator circuit so that the frequency of oscillation of said oscillator circuit is a function of the temperature of said chamber;
  frequency responsive timing means having an output related to the frequency of an electrical signal applied thereto;
  circuit means for coupling said oscillator means to said frequency responsive means for controlling the time duration said reaction is within said chamber in accordance with the frequency of said oscillator circuit, and
  means for setting the transfer function of said mechanism to be a function of the ratio of the value of said electrical property of said temperature sensitive element at a nominal chamber temperature over the change in value of said electrical property of said temperature sensitive element for a given change in temperature, times the ratio of the change in the reaction rate of said reaction for said given change in chamber temperature over the reaction rate of said reaction at said nominal temperature.

13. A temperature responsive timing mechanism for controlling the time duration a sample having a temperature sensitive reaction rate is contained within a chamber having temperature control comprising:
  oscillator means generating an electrical signal;
  temperature sensitive elements having an electrical property, the value of which changes with temperature, mounted within said chamber;
  circuit means for connecting said temperature sensitive element in a circuit for developing a control signal that is a function of the temperature of said chamber;
  an amplifier circuit coupled between said circuit means and said oscillator means for applying an amplified control signal to the oscillator means to control the frequency of oscillation;
  synchronous means connected to operate a control means for determining the time duration said sample is within said chamber in accordance with the frequency of a signal applied thereto,
  means for coupling said oscillator means to said synchronous means, and
  means for controlling the gain of said amplifier circuit to be approximately equal to the ratio of the value of said electrical property of said temperature sensitive element at the nominal temperature of said chamber over the change in the value of said electrical property of said temperature sensitive element for a given change in chamber temperature times the ratio of the change in sample reaction rate for said change in chamber temperature over the sample reaction rate at said nominal temperature.

References Cited
UNITED STATES PATENTS

| | | | |
|---|---|---|---|
| 2,451,858 | 10/1948 | Mork | 331—138 |
| 2,627,596 | 2/1953 | Andrews | 318—318 |
| 2,788,958 | 4/1957 | Tilden | 263—8 |

OTHER REFERENCES

Erickson and Bryant, Electrical Engineering and Practice, John Wiley and Sons, Inc., New York, 1959 (page 571, end of page).

MORRIS O. WOLK, Primary Examiner.

R. M. REESE, Assistant Examiner.

UNITED STATES PATENT OFFICE
CERTIFICATE OF CORRECTION

Patent No. 3,338,680  August 29, 1967

Alexander E. Martens

It is certified that error appears in the above identified patent and that said Letters Patent are hereby corrected as shown below:

Column 1, lines 38 to 40, in the equation:

$$-\frac{E}{T} \quad \text{should read} \quad -\frac{E}{RT}$$

Signed and sealed this 16th day of September 1969.

(SEAL)
Attest:

Edward M. Fletcher, Jr.
Attesting Officer

WILLIAM E. SCHUYLER, JR.
Commissioner of Patents